April 26, 1966 M. D. BEHRENS 3,247,666
MANIFOLD AFTERBURNER DEVICE FOR EXHAUST
EMISSIONS CONTROL IN AN INTERNAL
COMBUSTION ENGINE SYSTEM
Filed May 14, 1964 4 Sheets-Sheet 1
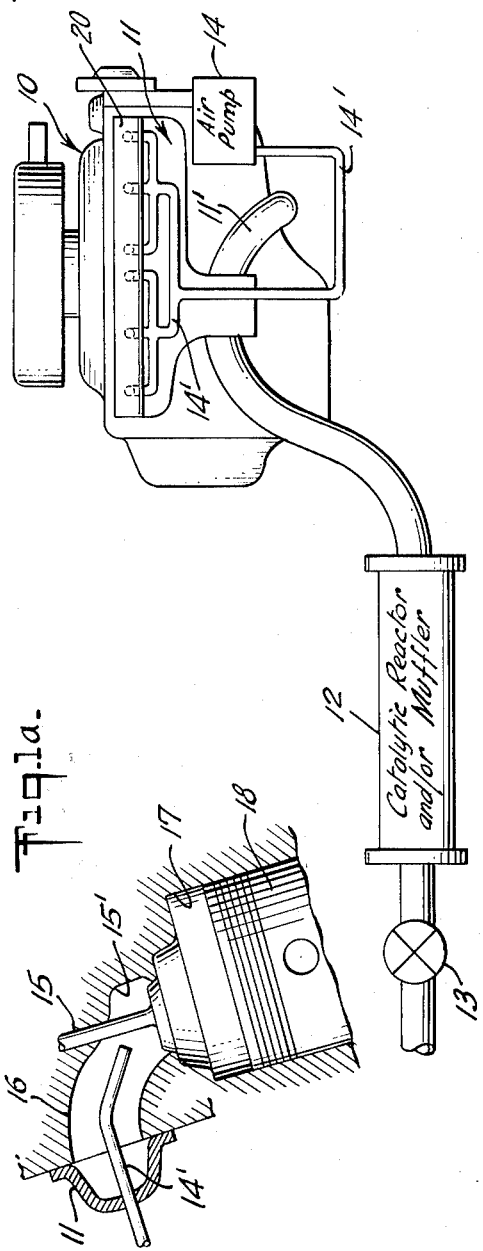
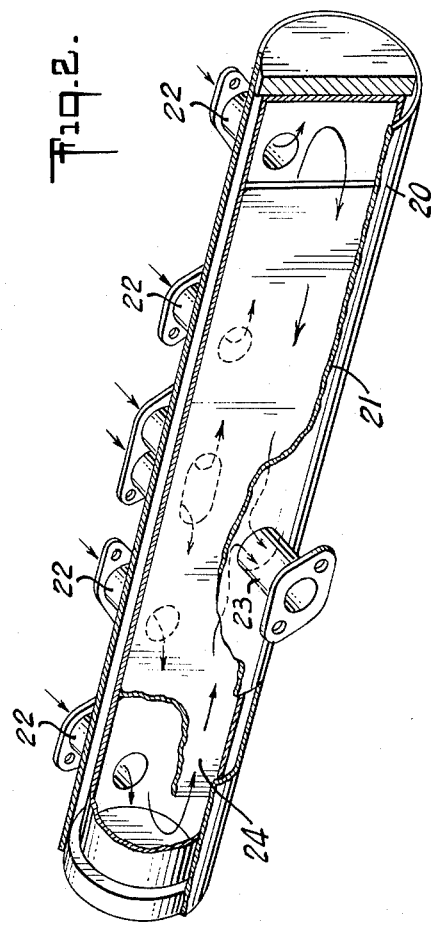

April 26, 1966

M. D. BEHRENS 3,247,666

MANIFOLD AFTERBURNER DEVICE FOR EXHAUST
EMISSIONS CONTROL IN AN INTERNAL
COMBUSTION ENGINE SYSTEM

Filed May 14, 1964

April 26, 1966  M. D. BEHRENS  3,247,666
MANIFOLD AFTERBURNER DEVICE FOR EXHAUST
EMISSIONS CONTROL IN AN INTERNAL
COMBUSTION ENGINE SYSTEM
Filed May 14, 1964  4 Sheets-Sheet 3
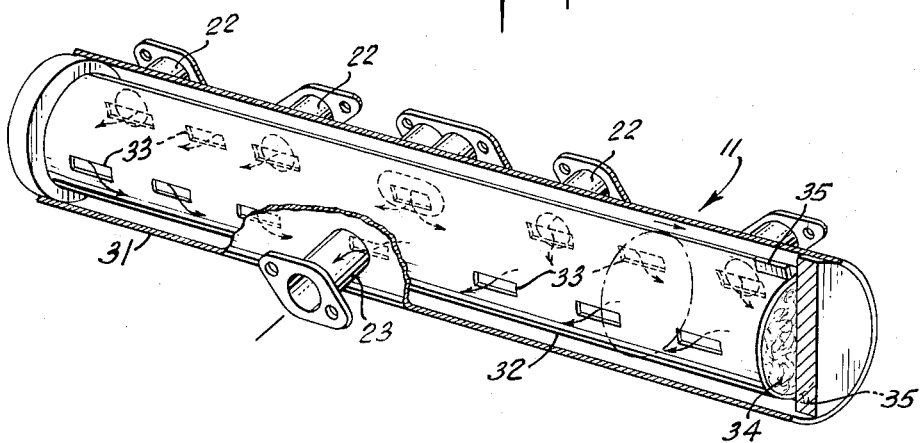
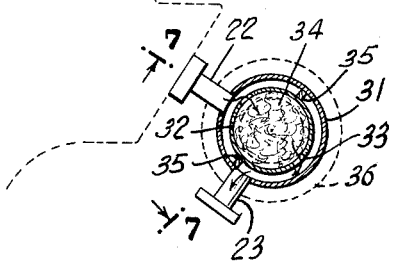
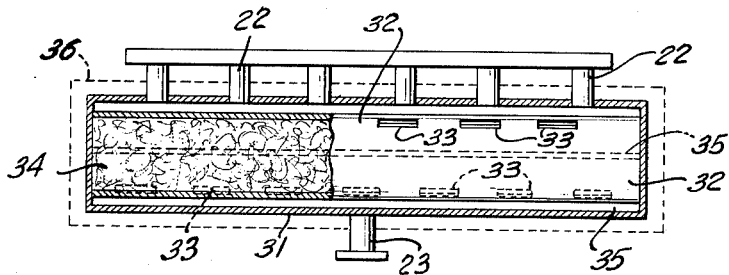

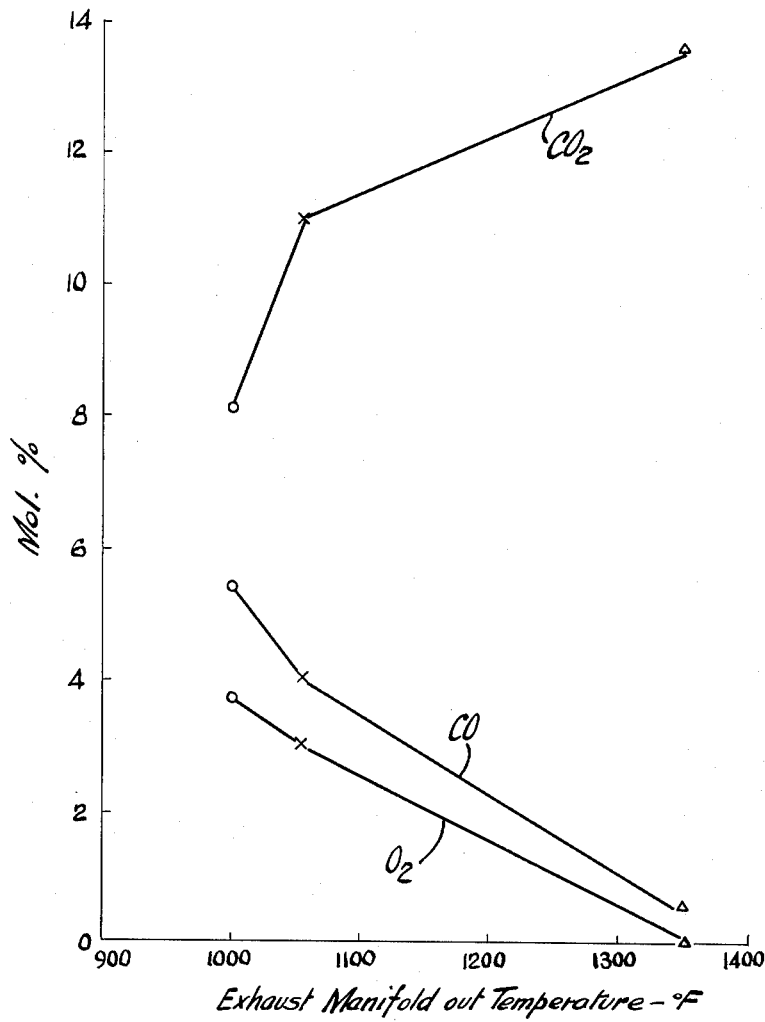

United States Patent Office 3,247,666
Patented Apr. 26, 1966

3,247,666
MANIFOLD AFTERBURNER DEVICE FOR EX-
HAUST EMISSIONS CONTROL IN AN IN-
TERNAL COMBUSTION ENGINE SYSTEM
Milton D. Behrens, Hopewell Junction, N.Y., assignor to
Texaco Inc., New York, N.Y., a corporation of
Delaware
Filed May 14, 1964, Ser. No. 367,520
16 Claims. (Cl. 60—30)

This invention relates generally to the operation of internal combustion engines, and in one specific embodiment, to an apparatus for improved manifold afterburning in the control of exhaust emissions from the products of combustion of an internal combustion engine.

Internal combustion engines generally operate at fuel-air mixtures which are richer than stoichiometric, with the result that in the exhaust products of combustion, there are considerable residual combustible compounds including carbon monoxide, hydrogen and hydrocarbons. For automotive exhaust emissions control, it is known that additional air should be added to such exhaust products to produce an overall fuel-air ratio in the exhaust system at least stoichiometric and preferably slightly leaner, and means must be provided for promoting the reaction of the combustible compounds in the exhaust with air to the eventual end products of water and carbon dioxide.

The introduction of air as an oxidizing fluid into the exhaust manifolds of internal combustion engines to convert the carbon monoxide in the engine exhaust products to carbon dioxide is known in the art. Such an oxidizing fluid is introduced adjacent the downstream face of the exhaust valve, where the temperature is sufficiently high so that further combustion can occur spontaneously. Means are also known for mixing and reacting additional air with the combustible compounds in the exhaust products in the form of catalytic reactors.

Accordingly, it is an object of my invention to provide an improved means for greatly reducing, if not eliminating for all practical purposes, combustible compounds in the exhaust products of combustion from an internal combustion engine.

It is another object of this invention to provide an improved apparatus for the substantially complete oxidation of the combustible compounds in the exhaust gases.

Still another object of my invention is to provide a simple but effective over temperature protection device for a catalytic reactor used in an automatic exhaust emissions control system in an internal combustion engine for the exhaust products of combustion thereof.

And another object of the invention is to provide an apparatus for improved manifold afterburning efficiency, especially during periods of high mass flow of exhaust gases.

These and other objects, features and advantages of the invention will become apparent from the following description and claims, when read in conjunction with the accompanying drawings wherein:

FIG. 1 is a diagramatic showing of an internal combustion engine employing my invention;

FIG. 1a is a way of providing additional air adjacent and downstream an exhaust port;

FIG. 2 is a simplified isometric view, partly in section, of the exhaust manifold afterburner device, showing the spaced wall insulating structure;

FIG. 5 is a view, similar to that of FIG. 2, showing a modification of the internal structure of the exhaust manifold afterburner device, without external insulation;

FIG. 6 is a view, similar to that of FIG. 3, showing an outer layer of insulation;

FIG. 7 is a longitudinal developed view taken along line 7—7 of FIG. 6, with an outer layer of insulation;

Figure 3:
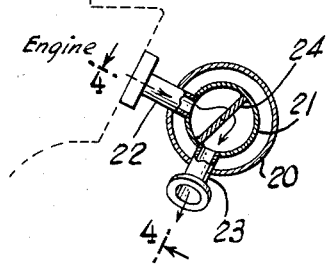
FIG. 3 is a cross section view taken through the inlet to and outlet from the exhaust manifold afterburner device.
Figure 9:
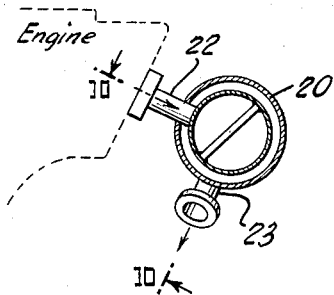
Figure 10:
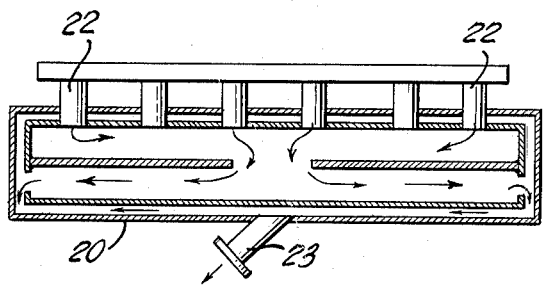
Figure 11:
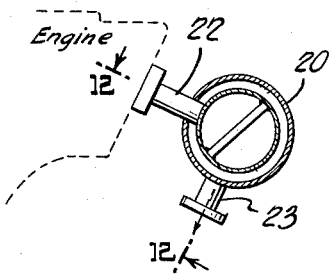
Figure 12:
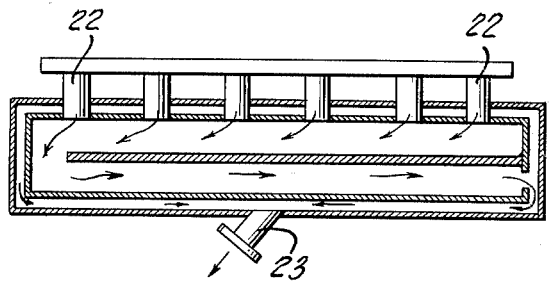

FIG. 8 is a graphical showing of the effect of the exhaust manifold construction on the exhaust gas composition; and FIGS. 9 and 11 are views corresponding to the view of FIG. 3, while FIGS. 10 and 12 are longitudinal developed views taken respectively along line 10—10, FIG. 9, and line 12—12, FIG. 11, showing modifications of the heat retention structure of the exhaust manifold afterburner device.

The objects of my invention are achieved by introducing additional air into the exhaust gases of an internal combustion engine for further reaction with the products of combustion exhausted therefrom and promoting the reaction of air and the residual combustibles therein by using an exhaust manifold afterburner device.

An engine driven pump has been found feasible for providing additional air to the engine exhaust system. The mixture of additional air and exhaust products of combustion undergoes some combustion prior to delivery to a chamber where more mixing and combustion occur. In some noncatalytic combustion types, such a chamber is known as a direct flame afterburner where ignition is initiated by positive means, such as a glow plug or a spark plug.

Catalytic reaction chambers or reactors are characterized by the features that (a) a catalyst is impregnated on a ceramic or refractory base in the form of bricks, spheres, pellets, or porous material, and (b) the exhaust gases plus additional air to complete the combustion thereof are introduced into the reaction chamber packed with the catalyst for mixing and reacting as they pass over and through the catalyst bed.

The principal advantages of the catalytic reactor over the direct flame afterburner are the lower reaction temperatures and the elimination of the extra fuel consumption. Some disadvantages are that the typical catalytic reactor is large and with a large thermal mass, a relatively long time of start-up operation is needed to warm up the catalyst to its activation temperature; and while some catalysts may resist lead poisoning, they tend to break up and become ineffective because of combined thermal and mechanical shock from "stop and go" driving and fluctuating load characteristics of automotive service, and from pulsating gas flow and mechanically induced vibrations. Also, deposits from the products of combustion may coat the catalyst and so impair its action.

Referring to FIG. 1 of the drawings, there is disclosed the general showing of an apparatus or engine system wherein the invention is used, consisting basically of an internal combustion engine at 10, with an exhaust system, including an exhaust manifold afterburner device at 11, leading to a catalytic muffler at 12. There is disclosed at 13, a diagrammatic showing of a valve for regulating exhaust back pressure, shown located downstream of the catalytic muffler. At 14, there is disclosed an engine driven air pump for providing additional air to the exhaust system of the engine, in the manner shown specifically in FIG. 1a, through inlet tubing 14'.

As known in the art, additional air is provided adjacent the downstream face of the exhaust valve 15, FIG. 1a, which closes the exhaust port at 15' in the cylinder head 16 of an internal combustion engine, having a cylinder located at 17 and a piston therein at 18. It is evident that with the inlet tubing 14' passing through the exhaust manifold indicated at 11, there is some preheating of the additional air. Preheating of the additional air may be accomplished in other ways, e.g. by cooling of engine locations subject to overheating, and could be used when engine characteristics suggest that the additional air be introduced at higher than ambient temperatures. The exhaust pipe at 11', FIG. 1, leads from the exhaust manifold of the other bank of engine cylinders, as in the case of V-type engines, and brings along the exhaust gases and additional air in various stages of reaction.

In the area of air introduction, the temperatures of the exhaust gases vary from 1400° F. to 2400° F., depending upon engine operating conditions, so that in the presence of additional air, the combustible compounds in the products of combustion can ignite spontaneously. At low and medium load conditions, it has been found that to promote a more complete combustion of the residual combustibles, additional back pressure should be imposed on the gases in the exhaust system in addition to that imposed by the conventional muffler and/or catalytic reactor construction. Normally, the exhaust back pressure imposed by the conventional muffler structure at engine idling conditions is generally zero, and under conditions of wide open throttle operation (at approximately 70 m.p.h. and higher) may amount generally to as much as 10 to 15 p.s.i., due largely to the large mass volume of gasses, as well as to their inertia, passing through the muffler.

In my copending and coassigned application for patent for an Internal Combustion Engine System for Exhaust Emissions Control, Ser. No. 335,122, filed January 2, 1964, the disclosure of which is incorporated herein by this reference, the introduction of additional air and the raising of the exhaust back pressure to further the reaction with the exhaust products of combustion is set forth. Therein is disclosed that to achieve the improved afterburning conditions, as a generalization, the excess back pressure should be greater than that imposed by the ordinary muffler construction, and should be greater than 1.05 times the atmospheric pressure to attain at least minimum control standards of reduction of hydrocarbon content.

Certain present statutory requirements for reducing pollutants contributing to air pollution include that the hydrocarbon concentration of the average automotive exhaust gases be reduced to an average of 275 p.p.m., and carbon monoxide concentration to an average of 1.5%. To meet such present statutory requirements, it is known that the exhaust back pressure ratio should be about ⅛ greater than the atmospheric pressure.

Further, there is disclosed in my above cited copending application for patent that with the use of elevated exhaust back pressure in promoting the exhaust system afterburning reaction, with the addition of air, the ratio of the actual fuel-air mixture to the stoichiometric fuel-air mixture in the exhaust system, being indicated as $\gamma$, varies from about 0.85 to about 1.25. The addition of air is continuous and is provided the exhaust system at a pressure sufficient for free flow thereto. Too great an amount of additional air leads to lowering of the temperature in the exhaust system so that the extent of additional burning is decreased and the cost of pumping is increased. When necessary, the additional air can be preheated, too.

While the concentration of the combustible compounds in the exhaust products of combustion can be reduced satisfactorily to meet the minimum conditions set by certain present ordinances, it is possible to reduce further the unburned hydrocarbon concentration by the use of a catalytic reactor positioned in or adjacent the muffler for a further afterburning reaction. Such a catalytic reactor could provide not only for the reduction of the hydrocarbon concentration but also control the amounts of other gases, such as the oxides of nitrogen, which are included in the noxious materials leaving the exhaust system afterburning reaction. The introduction of additional air into the exhaust system adjacent an exhaust port causes combustion of hydrocarbons and carbon monoxide and raises the temperature in this area higher than normal. This higher temperature then causes even more complete or greater combustion of hydrocarbons and carbon monoxide in the area of the exhaust port and manifold. Thus, hydrocarbons and carbon monoxide which undergo combustion in the exhaust manifold area obviously reduce the load on the catalytic reactor. To achieve such results, FIG. 1 discloses diagrammatically a basic structure by which the exhaust back pressure is maintained at the required level to promote the exhaust system afterburning, with the valve at 13 to control the back pressure on the exhaust gases flowing through the catalytic muffler at 12. The catalytic muffler is connected to the exhaust manifold 11 by an exhaust pipe of sufficient volume and optimum length; short enough that following cold starts and during idle and deceleration, the exhaust gases will be hot enough to insure rapid warm up of the catalyst, thereby resulting in effective oxidation of the hydrocarbons and CO in the catalytic muffler and yet far enough away so that during cruise and high speeds the exhaust gases will have time for combustion and cooling prior to their entry into the catalytic muffler thereby decreasing the heat load on the catalyst.

Figure 4:
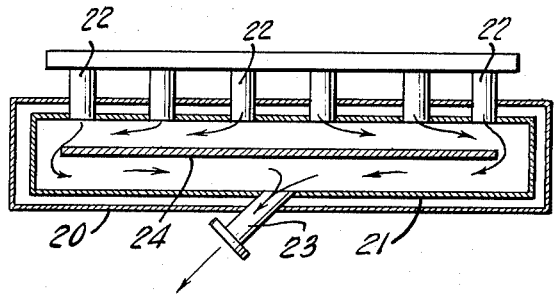
FIG. 4 is a longitudinal developed view taken along line 4—4 of FIG. 3.

Referring to FIGS. 2, 3 and 4, the exhaust manifold afterburner device includes the exhaust manifold 11, consisting of the outer casing 20, and an enlarged exhaust gas manifold proper 21, having inlets 22 thereinto and outlet 23 therefrom, for interconnection respectively with the engine exhaust ports and exhaust system piping, not shown in these figures. The manifold 21, which is larger than the normal exhaust manifold, is spaced in sealed relationship with the outer casing 20 to provide a substantially annular insulating air space, and in addition includes an imperforate internal baffle 24 positioned between the inlets and the outlet to increase the path of gas flow therebetween and to serve as a heat sink.

FIGS. 5, 6 and 7 show a modification of the structure of FIGS. 2, 3 and 4, disclosing the exhaust manifold afterburner device 11 as comprising the outer casing 31, and inner canister 32, of a comparable configuration, with perforations 33 positioned in opposite staggered relationship to each other on the longitudinal surface thereof, certain of the perforations being positioned adjacent the inlets from the engine exhaust ports. The canister 32 contains a quantity of metal mesh 34, which serves not only as a heat sink but also as a filamentary baffle for the exhaust gases flowing between the inlets 22 and outlet 23. The canister is held in spaced relationship from the outer casing 31 by the supporting flanges 35, which prevent the flow of gases around the canister and direct the same through the perforations 33. The efficacy of the large volume exhaust manifold using a baffle, either as a solid member 24 or the filamentary material of metal mesh 34, is shown in FIG. 8, the notations thereon being self-explanatory. In this respect, FIGS. 6 and 7 show an optional layer of insulation 36, which can be applied as conditions require, in order that the temperature within the exhaust manifold afterburner device may be held at the desired higher levels, inasmuch as there would be greater heat loss than in the spaced wall insulating structure disclosed in FIGS. 2, 3 and 4.

FIGS. 9, 10, 11 and 12 disclose optional modifications of an exhaust manifold afterburner device utilizing solid baffles for increasing the exhaust gas flow path and for heat retention purposes, circulating exhaust gases in the annular space between the outer casing and the exhaust gas manifold proper. Only the enumeration of the common elements is indicated, while the disclosure in these figures of the remaining elements is considered evident and without need of further numeration and description.

In my copending application for patent for a Catalytic Muffler Construction for Exhaust Emissions Control in an Internal Combustion Engine, Ser. No. 356,797, filed April 2, 1964, the disclosure which is incorporated herein by this reference, there are disclosed several ways in which catalyst material is prepared for inclusion in a catalytic muffler. Briefly, the catalyst material is formed from a substrate comprising an aggregate of stainless steel wool, upon which is deposited an adherent film of alumina, preferably by contacting the substrate with a solution of an alkali metal aluminate, and after processing, the alumina coated substrate is impregnated with one or more oxidation catalysts. As disclosed in this latter cited application, a copper oxide-copper chromite complex is useful as a catalyst.

The filamentary baffle or metal mesh 34 of FIGS. 5, 6 and 7 can be bonded to the canister 32 in the same way, thus providing a rigid structure with adequate porosity to avoid undue pressure drop. A suitable catalyst can be impregnated on the alumina bearing substrate to provide catalytic reaction adjacent the exhaust ports, in addition to that which occurs in the catalytic reactor further downstream.

Because the copper oxide-copper chromite complex is an excellent oxidation catalyst for CO, and because CO emissions during wide-open-throttle engine operation are high, severe high temperature conditions in the catalyst bed have been found to exist during high output engine operations.

These conditions can be eased by improving the efficiency of the afterburning reaction ahead of the catalyst by the use of the enlarged exhaust manifold construction. Test results of the performance of medium and large automotive engines utilizing such a construction are set out in Tables I and II below.

Table I.—Afterburner performance with medium vehicles

[California MVPCB test procedure]

|  | Exhaust Emissions | |
|---|---|---|
|  | HC, p.p.m. C₆ | CO, percent |
| Medium "A": |  |  |
| Basic Engine | 385 | 1.0 |
| Manifold Afterburner without Exhaust Back Pressure Valve (W/O EBP Valve) | 275 | 0.6 |
| Manifold Afterburner Catalytic Reactor W/O, EBP Valve | 185 | 0.7 |
| Medium "B": |  |  |
| Basic Engine | 335 | 1.3 |
| Manifold Afterburner W/O EBP Valve | 270 | 1.1 |
| Manifold Afterburner Catalytic Reactor W/O EBP Valve | 145 | 0.8 |

Table II.—Afterburner performance with large vehicles

[California MVPCB test procedure (after 12,000 miles)]

|  | Exhaust Emissions | |
|---|---|---|
|  | HC, p.p.m. C₆ | CO, percent |
| Large "A": |  |  |
| Basic Engine | 770 | 2.5 |
| Manifold Afterburner W/EBP Valve | 325 | 1.1 |
| Manifold Afterburner Catalytic Reactor W/ EBP Valve | 235 | 1.0 |
| Large "B": |  |  |
| Basic Engine | 485 | 3.0 |
| Manifold Afterburner W/EBP Valve | 290 | 1.6 |
| Manifold Afterburner Catalytic Reactor W/ EBP Valve | 215 | 1.3 |

The emissions, after completion of the tests, were well within the California standards.

The large volume exhaust manifold construction is advantageous for use especially where road operations are at a high engine load factor with considerable rich mixture operation and high concentrations of combustibles. For optimum afterburner reaction, the ratio of the sum of the volume of the insulated exhaust manifold and the sum of the volumes of the exhaust passages leading thereto to the engine displacement should range from 0.7 to 2.0.

Thus, there has been shown and described a device which permits placement of the catalyst material closer to the exhaust manifold providing for more rapid catalyst warm up while protected from severe high temperature operating conditions, since the improved afterburning reaction relieves the conversion load on the catalyst. No warm up period is required for operation of the disclosed automotive exhaust emissions control system since proper temperature for reaction between engine exhaust products and additional air are obtained either at the exhaust ports or in the adjacent exhaust manifold immediately upon starting of the internal combustion engine.

Other modifications and variations of the invention, as hereinbefore set forth, may be made without departing from the spirit and scope thereof, and therefore, only such limitations should be imposed as are indicated in the appended claims.

I claim:

1. In a system for treating exhaust gases including a catalytic reactor for removal of pollutants from said gases, an over temperature protection device for said reactor positioned upstream thereof in said system and comprising a pair of casing members positioned in spaced relationship to each other to define a hollow chamber therebetween, the inner casing member of said pair having an inlet and an outlet for passage of said gases with each extending through the wall of the outer casing member, said inner casing member being supported in spaced relationship to the outer casing member of said pair and being insulated therefrom by said hollow chamber and having a baffle to provide for indirect passage of said gases from said inlet to said outlet.

2. In the system as defined in claim 1, said inner casing member including a filamentary mass joined to the interior thereof thereby providing a heat sink therewithin.

3. In the system as defined in claim 1, said inner casing member including a plate like baffle positioned opposite said inlet to provide for gas flow around the ends of said baffle to said outlet.

4. An exhaust manifold afterburner device for interconnection into an exhaust system leading from an exhaust port of a cylinder of an internal combustion engine including a catalytic reactor for reducing pollutants in the exhaust emissions of said engine comprising a reaction chamber defined by an outer casing member having a substantially greater dimension than that of the normal exhaust manifold and with an inlet and an outlet, and an inner casing member comprising an exhaust manifold spaced therewithin and with said outer casing member defining a hollow chamber and having an inlet leading from an exhaust port of said cylinder and an outlet, said inner casing member having a baffle means positioned opposite said inlet to provide for indirect gas flow to said outlet, the ratio of the sum of the volume of said exhaust manifold and the exhaust system from said exhaust port to the engine displacement is in the range of from 0.7 to 2.0.

5. Means for reducing the amount of residual combustibles in the products of combustion from a cylinder of an internal combustion engine comprising, an exhaust system leading from an exhaust port of said cylinder, and means for providing air in at least stoichiometric ratio adjacent and downstream said exhaust port for combustion of said residual combustibles among the exhaust products in said exhaust system, said exhaust system including a large volume afterburner construction located downstream said means for providing air, and having a volume greater than that of the conventional exhaust system so that the ratio thereof to the engine displacement is in the range of from 0.7 to 2.0, said afterburner construction comprising an outer casing and an inner casing with an inlet and an outlet thereinto, said inlet and said outlet passing through said outer casing, said inner casing comprising an exhaust manifold having a greater volume than the normal engine exhaust manifold and being positioned in spaced relationship with said outer casing to define a hollow chamber therewith, and baffle means positioned within said inner casing opposite said inlet to provide for indirect flow of gases to said outlets.

6. In the means as defined in claim 5, said baffle means comprising a filamentary mass bonded to the interior of said inner casing to provide a rigid, porous structure therewithin.

7. In the means as defined in claim 5, means for controlling the back pressure in said exhaust system comprising valve means positioned downstream from said exhaust port and in the piping of said exhaust system functioning to restrict mass flow at the lower speeds above idle thereby to maintain a back pressure higher than the normal back pressure of said exhaust system without said valve means and opening at the higher speeds and mass flow rates when said normal back pressure without said valve means is above the maintained back pressure at said lower speeds above idle.

8. In the means as defined in claim 7, said exhaust system including a catalytic muffler positioned downstream said afterburner construction and upstream said valve means.

9. In the means as defined in claim 8, said catalytic muffler incorporating a catalyst material comprising an oxidation catalyst, said oxidation catalyst comprising a copper oxide-copper chromite complex.

10. In the means as defined in claim 9, said catalyst material comprising a substrate with an adherent film of alumina, said oxidation catalyst being adherent thereon.

11. In an internal combustion engine having a cylinder, means for reducing the amount of residual combustibles in the products of combustion from said cylinder comprising an exhaust system leading from an exhaust port of said cylinder, means for providing air in at least stoichiometric ratio adjacent and downstream said exhaust port for combustion of said residual combustibles among the exhaust products in said exhaust system, and means for controlling the back pressure in said exhaust system comprising valve means positioned therein downstream from said exhaust port functioning to restrict mass flow at the lower speeds above idle thereby to maintain a back pressure higher than the normal back pressure of said exhaust system without said valve means and opening at the higher speeds and mass flow rates when said normal back pressure without said valve means is above the imposed back pressure, said exhaust system including a large volume afterburner construction positioned between said means for providing air and said means for elevating the back pressure in said system and comprising an enlarged exhaust manifold of increased dimension over that of conventional automotive exhaust manifold design so that the volume relationship of the sum of the volumes of said enlarged exhaust manifold and the exhaust system leading thereto to the engine displacement is in the range of from 0.7 to 2.0, said construction including a casing for said manifold positioned in spaced relationship therewith to provide an insulating air space, said manifold having an inlet and an outlet passing through said casing for connection of said manifold into said system, said exhaust manifold including a solid baffle positioned between said inlet and said outlet to form an indirect flow passage therebetween.

12. In the internal combustion engine as defined in claim 11, said exhaust system including a catalytic muffler positioned downstream said afterburner construction and upstream said valve means.

13. Apparatus for reducing the amount of pollutants in the products of combustion from an internal combustion engine having a cylinder with an exhaust port and including an exhaust system leading from said exhaust port, comprising, in combination, means for providing air in at least stoichiometric ratio to the products of combustion having pollutants adjacent and downstream said exhaust port, an exhaust pipe afterburner construction and a catalytic muffler positioned in successive downstream relationship to each other in said exhaust system for removal of said pollutants, said afterburner construction comprising a chamber defined by a pair of spaced members having an inlet and an outlet for interconnection into said exhaust system, said pair of spaced members comprising an enlarged exhaust manifold of greater dimension than the conventional engine exhaust manifold design, and an outer casing therefor in spaced relationship therewith thereby to define a hollow chamber, said inlet and said outlet passing through said casing and being joined to said enlarged exhaust manifold, and baffle means within said enlarged exhaust manifold to provide for indirect gas flow therethrough, the volume ratio of the sums of the volume of said enlarged exhaust manifold and the volume of the exhaust system leading thereto to the engine displacement varying being in the range of from 0.7 to 2.0.

14. In the apparatus as defined in claim 13, said catalytic muffler incorporating a catalyst material comprising an oxidation catalyst, said oxidation catalyst comprising a copper oxide-copper chromite complex.

15. In the apparatus as defined in claim 14, said catalyst material comprising a substrate with an adherent film of alumina, said oxidation catalyst being adherent thereon.

16. In the apparatus as defined in claim 15, means for controlling the back pressure in said exhaust system comprising valve means positioned therein downstream said catalytic reactor and muffler structure including an exhaust back pressure valve which is partially closed to keep back pressure at an elevated level above that of the normal back pressure in said system without said valve when said engine is operating at the lower speeds above idle and which is opened at the higher speeds when mass flow rates are maximum when the pressure of the exhaust system without said valve is above the pressure maintained at the lower speeds.

References Cited by the Examiner

UNITED STATES PATENTS

| | | | |
|---|---|---|---|
| 983,307 | 2/1911 | Perkins. | |
| 1,824,078 | 9/1931 | Fischer | 60—30 X |
| 1,836,217 | 12/1931 | Woolson | 60—29 X |
| 2,038,567 | 4/1936 | Ittner | 60—30 X |
| 2,174,626 | 10/1939 | Fogas | 60—30 |
| 2,203,554 | 6/1940 | Uhri et al. | 60—30 X |
| 2,787,119 | 4/1957 | Giambruno | 60—30 |
| 2,807,930 | 10/1957 | Bratton | 60—30 |
| 2,981,057 | 4/1961 | Buttler | 60—29 |
| 3,065,595 | 11/1962 | Gary | 60—30 |
| 3,091,078 | 5/1963 | Dworak | 60—30 |

SAMUEL LEVINE, *Primary Examiner.*

EDGAR W. GEOGHEGAN, *Examiner.*